(12) United States Patent
Kumagai et al.

(10) Patent No.: US 9,163,541 B2
(45) Date of Patent: Oct. 20, 2015

(54) CONTROL DEVICE FOR AN ELECTRICALLY HEATED CATALYST, AND ELECTRODE DETERIORATION DEGREE ESTIMATION DEVICE FOR AN ELECTRICALLY HEATED CATALYST

(75) Inventors: Noriaki Kumagai, Susono (JP); Mamoru Yoshioka, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/357,363

(22) PCT Filed: Nov. 25, 2011

(86) PCT No.: PCT/JP2011/077209
§ 371 (c)(1),
(2), (4) Date: Jun. 19, 2014

(87) PCT Pub. No.: WO2013/076868
PCT Pub. Date: May 30, 2013

(65) Prior Publication Data
US 2014/0305102 A1 Oct. 16, 2014

(51) Int. Cl.
*F01N 9/00* (2006.01)
*F01N 3/20* (2006.01)
*F01N 3/10* (2006.01)

(52) U.S. Cl.
CPC ............ *F01N 3/2013* (2013.01); *F01N 3/2026* (2013.01); *F01N 9/00* (2013.01); *F01N 3/101* (2013.01); *F01N 9/007* (2013.01); *F01N 2240/16* (2013.01); *F01N 2260/10* (2013.01); *F01N 2390/02* (2013.01); *F01N 2430/08* (2013.01); *F01N 2550/22* (2013.01); *F01N 2900/0418* (2013.01); *F01N 2900/0421* (2013.01); *F01N 2900/1602* (2013.01); *F01N 2900/1624* (2013.01); *F01N 2900/1631* (2013.01); *Y02T 10/22* (2013.01); *Y02T 10/26* (2013.01)

(58) Field of Classification Search
CPC ....... F01N 3/101; F01N 3/2026; F01N 9/007; F01N 2240/16; F01N 2390/02; F01N 2430/08; F01N 2900/0418; F01N 2900/0421; F01N 2900/1602; F01N 2900/1624; F01N 2900/1631; Y02T 10/22; Y02T 10/26
USPC ........... 60/275, 277, 284, 285, 286, 300, 303, 60/320
See application file for complete search history.

(56) References Cited

U.S. PATENT DOCUMENTS 5,414,996 A 5/1995 Sawada et al.

FOREIGN PATENT DOCUMENTS

| JP | 05-133264 A | 5/1993 |
| JP | 11-257059 A | 9/1999 |
| JP | 2010-229978 A | 10/2010 |

*Primary Examiner* — Thomas Denion
*Assistant Examiner* — Jorge Leon, Jr.
(74) *Attorney, Agent, or Firm* — Kenyon & Kenyon LLP

(57) ABSTRACT

The present invention is intended to provide a technique which is capable of contributing to the suppression of the deterioration of surface electrodes in an electrically heated catalyst. The electrically heated catalyst according to the invention is provided with a heat generation element to heat a catalyst, and a pair of electrodes to supply electricity to the heat generation element. Each of the pair of electrodes has a surface electrode which spreads along a surface of the heat generation element, and the surface electrodes are arranged in opposition to each other with the heat generation element being sandwiched therebetween. Then, when a frequency becomes large in which a condition was satisfied in which a difference in temperature between two points located at a predetermined distance from each other on surfaces or in insides of the surface electrodes exceeds a predetermined temperature difference, an electric power supplied to the heat generation element is decreased, and an amount of heat supplied to the EHC by an exhaust gas is increased, as compared with when the frequency is small.

6 Claims, 11 Drawing Sheets

CONTROL DEVICE FOR AN ELECTRICALLY HEATED CATALYST, AND ELECTRODE DETERIORATION DEGREE ESTIMATION DEVICE FOR AN ELECTRICALLY HEATED CATALYST

CROSS-REFERENCE TO RELATED APPLICATIONS

This is a national phase application based on the PCT International Patent Application No. PCT/JP2011/077209 filed Nov. 25, 2011, the entire contents of which are incorporated herein by reference.

TECHNICAL FIELD

The present invention relates to a control device for an electrically heated catalyst, and an electrode deterioration degree estimation device for an electrically heated catalyst.

BACKGROUND ART

In the past, as an exhaust gas purification catalyst arranged in an exhaust passage of an internal combustion engine, there has been developed an electrically heated catalyst (hereinafter, may also be referred to as an EHC) in which a catalyst is heated by means of a heat generation element which generates heat by electrical energization thereof.

In the EHC, the heat generation element is provided with a pair of electrodes for supplying electricity thereto. Each of the electrodes has a surface electrode which spreads along the surface of the heat generation element. The surface electrodes are arranged in opposition to each other with the heat generation element being sandwiched therebetween. With the surface electrodes being arranged in this manner, electricity is supplied to a wide area of the heat generation element. As a result, the heat generation element generates heat uniformly as much as possible over the wide area.

In Patent Document 1, there is disclosed a control system of an energization heating type honeycomb body. In this control system of the energization heating type honeycomb body, a resistance value of the energization heating type honeycomb body is calculated from a voltage and a current value. Then, a voltage and/or an electric current to be supplied is controlled based on the resistance value thus calculated, whereby the temperature control of the energization heating type honeycomb body is carried out.

In Patent Document 2, there is disclosed a catalytic heater energization control device which controls electric power supplied to an electrically energized heater. In this catalytic heater energization control device, the richer becomes the air fuel ratio of an air fuel mixture in an internal combustion engine, the lower the value of electric power supplied to the electrically energized heater is set.

In Patent Document 3, there is disclosed a catalyst deterioration degree detection device. In this catalyst deterioration degree detection device, an air fuel ratio at the upstream side of a catalyst is changed over from either one of a preset air fuel ratio of a lean side with respect to a stoichiometric air fuel ratio and a preset air fuel ratio of a rich side with respect to the stoichiometric air fuel ratio to the other. Then, after the change over of the air fuel ratio, an absolute amount of oxygen stored and held by the catalyst is calculated from an amount of catalyst flow-through gas which will flow through the catalyst by the time a detected value of an air fuel ratio sensor arranged at the downstream side of the catalyst reaches the above-mentioned preset air fuel ratio after the change over of the air fuel ratio, and a deviation of the above-mentioned preset air fuel ratio after the change over of the air fuel ratio with respect to the stoichiometric air fuel ratio. The degree of the deterioration of the catalyst is detected from this absolute amount.

PRIOR ART DOCUMENTS

Patent Documents

Patent Document 1: Japanese Patent Laid-Open Publication No. 2010-229978
Patent Document 2: Japanese Patent Laid-Open Publication No. H11-257059
Patent Document 3: Japanese Patent Laid-Open Publication No. H05-133264

SUMMARY OF THE INVENTION

Problems to be Solved by the Invention

The present invention has for its object to provide a technique which is capable of contributing to the suppression of the deterioration of surface electrodes in an EHC.

Means for Solving the Problems

A first aspect of the present invention is to control an electric power supplied to a heat generation element as well as an amount of heat supplied to an EHC by an exhaust gas, based on the number of times (i.e., frequency) that a condition was satisfied in which a temperature between two points located at a predetermined distance from each other on surfaces or in insides of surface electrodes of the EHC exceeds a predetermined temperature difference.

More specifically, according to the first aspect of the present invention, there is provided a control device for an electrically heated catalyst which is arranged in an exhaust passage of an internal combustion engine, and which is provided with a heat generation element and a pair of electrodes that supply electricity to said heat generation element, wherein said heat generation element is electrically energized to generate heat so that a catalyst is heated by the generation of heat;

wherein each of said pair of electrodes has a surface electrode which spreads along a surface of said heat generation element, and said surface electrodes are arranged in opposition to each other with said heat generation element being sandwiched therebetween; and wherein a control unit is provided which decreases an electric power supplied to said heat generation element, and increases an amount of heat supplied to the electrically heated catalyst by an exhaust gas, when a frequency becomes large in which a condition was satisfied in which a difference in temperature between two points located at a predetermined distance from each other on surfaces or in insides of said surface electrodes exceeds a predetermined temperature difference, as compared with when said frequency is small.

When a difference in temperature occurs on the surfaces or in the insides of the surface electrodes, accompanying a rapid change in the temperature of the EHC, thermal stress will be applied to the surface electrodes. As a result, fine cracks may occur in the surface electrodes. Here, the "predetermined distance" and the "predetermined temperature difference" are values with which when the difference in temperature between the two points located at said predetermined distance from each other on the surfaces or in the insides of the surface electrodes exceeds said predetermined temperature difference, it can be judged that cracks will occur in the surface electrodes due to thermal stress.

The more the frequency in which the difference in temperature between said two points on the surfaces or in the insides of the surface electrodes exceeded the predetermined temperature difference, the larger the cracks in the surface electrodes become, or the more the number of the cracks increases. In other words, deterioration of the surface electrodes is promoted. Accordingly, in the present invention, when the frequency becomes large, the electric power supplied to the heat generation element is caused to decrease, and the amount of heat supplied to the EHC by the exhaust gas is caused to increase, as compared with when the frequency is small.

By decreasing the electric power supplied to the heat generation element, it is possible to suppress the cracks in the surface electrodes from being enlarged in size and increased in number. That is, the deterioration of the surface electrodes can be suppressed. In addition, even if the electric power supplied to the heat generation element is decreased, the temperature of the EHC can be caused to go up to a sufficient extent by increasing the amount of heat supplied to the EHC by the exhaust gas. For that reason, the deterioration of exhaust characteristics can be suppressed.

When the internal combustion engine is cold started, the temperature of the EHC becomes low. For that reason, when a large amount of heat is supplied to the EHC for a short period of time at the time of cold start of the internal combustion engine, a large difference in temperature will be generated on the surfaces or in the insides of the surface electrodes.

Accordingly in the present invention, the condition in which the difference in temperature between said two points on the surfaces or in the insides of the surface electrodes exceeds the predetermined temperature difference may be such that the internal combustion engine is cold started and an integrated value of an amount of intake air in the internal combustion engine or an integrated value of the amount of heat supplied to the EHC, in a period of time from the engine starting until a predetermined period of time has passed, exceeds a predetermined value. Here, the "predetermined period of time" and the "predetermined value" are values with which it can be judged that there occurs a difference in temperature between said two points on the surfaces or in the insides of the surface electrodes to such an extent as to exceed the predetermined temperature difference.

In addition, the deterioration of the surface electrodes is promoted not only by the cracks resulting from thermal stress but also by oxidation thereof. Then, in cases where the catalyst is carried on or supported by the heat generation element, the degree of the progress of the oxidation of the surface electrodes has a correlation with the degree of the progress of the sintering of the catalyst. Also, the higher the degree of the progress of the sintering of the catalyst, the smaller becomes a maximum oxygen storage amount, which is a maximum value of an amount of oxygen which can be retained or held in the catalyst.

Accordingly, in this invention, in cases where the catalyst is supported by the heat generation element, when the maximum oxygen storage amount of the catalyst becomes small, the control unit may decrease the electric power supplied to the heat generation element, and increase the amount of heat supplied to the EHC by the exhaust gas, as compared with when the amount is large.

According to this, in a state where the deterioration of the surface electrodes due to oxidation thereof has progressed, it is possible to suppress the deterioration of the surface electrodes due to the cracks from further progressing.

A second aspect of the present invention is to estimate a degree of deterioration of surface electrodes, based on the number of times (i.e., frequency) that a condition was satisfied in which a temperature between two points located at a predetermined distance from each other on surfaces or in insides of the surface electrodes of an EHC exceeds a predetermined temperature difference.

More specifically, according to the second aspect of the present invention, there is provided a surface electrode deterioration degree estimation device for an electrically heated catalyst which is arranged in an exhaust passage of an internal combustion engine, and which is provided with a heat generation element and a pair of electrodes that supply electricity to said heat generation element, wherein said heat generation element is electrically energized to generate heat so that a catalyst is heated by the generation of heat;

wherein each of said pair of electrodes has a surface electrode which spreads along a surface of said heat generation element, and said surface electrodes are arranged in opposition to each other with said heat generation element being sandwiched therebetween; and wherein an estimation unit is provided which estimates that a degree of deterioration of said surface electrodes is higher when a frequency becomes large in which a condition was satisfied in which a difference in temperature between two points located at a predetermined distance from each other on surfaces or in insides of said surface electrodes exceeds a predetermined temperature difference, than when said frequency is small.

Here, similar to the first aspect of the present invention, the "predetermined distance" and the "predetermined temperature difference" are values with which when the difference in temperature between the two points located at said predetermined distance from each other on the surfaces or in the insides of the surface electrodes exceeds said predetermined temperature difference, it can be judged that cracks will occur in the surface electrodes due to thermal stress.

As described above, the more the frequency in which the difference in temperature between said two points on the surfaces or in the insides of the surface electrodes exceeded the predetermined temperature difference, the larger the cracks in the surface electrodes become, or the more the number of the cracks increases. In other words, deterioration of the surface electrodes is promoted. For that reason, it can be estimated that when the frequency becomes larger, the degree of deterioration of the surface electrodes is higher than when the frequency is small.

In addition, in this second aspect of the present invention, too, the condition in which the difference in temperature between said two points on the surfaces or in the insides of the surface electrodes exceeds the predetermined temperature difference may be such that the internal combustion engine is cold started and an integrated value of an amount of intake air in the internal combustion engine or an integrated value of the amount of heat supplied to the EHC, in a period of time from the engine starting until a predetermined period of time has passed, exceeds a predetermined value. Here, similar to the first aspect of the present invention, the "predetermined period of time" and the "predetermined value" are values with which it can be judged that there occurs a difference in temperature between said two points on the surfaces or in the insides of the surface electrodes to such an extent as to exceed the predetermined temperature difference.

Moreover, in this second aspect of the present invention, in cases where the catalyst is supported by the heat generation element, the estimation unit may estimate that the degree of deterioration of the surface electrodes is higher when the maximum oxygen storage amount of the catalyst becomes small, than when the amount is large.

According to this, it is possible to estimate the degree of deterioration of the surface electrodes, in consideration of not only deterioration due to cracks but also deterioration due to oxidation. For that reason, the degree of deterioration of the surface electrodes can be estimated with a higher degree of accuracy.

Advantageous Effect of the Invention

According to the present invention, it is possible to contribute to the suppression of the deterioration of the surface electrodes in the EHC.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
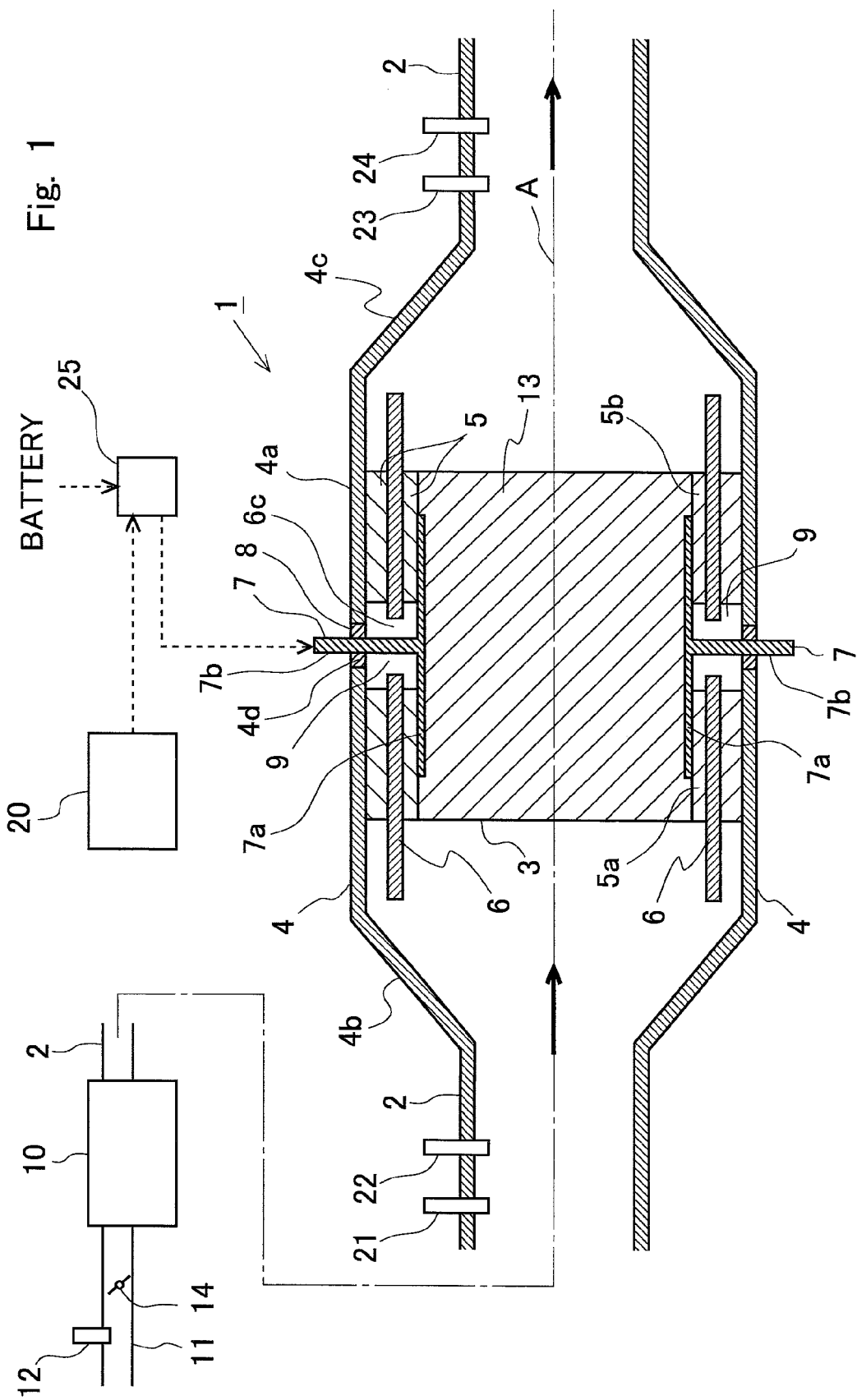
FIG. 1 is a view showing the schematic construction of intake and exhaust systems and an EHC of an internal combustion engine according to a first embodiment of the present invention.

Schematic Construction of Intake and Exhaust Systems and EHC of Internal Combustion Engine FIG. 1 is a view showing the schematic construction of intake and exhaust systems and an EHC of an internal combustion engine according to this embodiment.

The EHC 1 according to this embodiment is arranged in an exhaust pipe 2 of the internal combustion engine 10. The internal combustion engine 10 is a gasoline engine for driving a vehicle. However, note that the internal combustion engine related to the present invention is not limited to a gasoline engine, but may be a diesel engine, etc. In an intake pipe 11 of the internal combustion engine 10, there are arranged an air flow meter 12 and a throttle valve 14.

A first temperature sensor 21 and a first air fuel ratio sensor 22 are arranged in the exhaust pipe 2 at the upstream side of the EHC 1. A second temperature sensor 23 and a second air fuel ratio sensor 24 are arranged in the exhaust pipe 2 at the downstream side of the EHC 1. The first and second temperature sensors 21, 23 detect the temperature of an exhaust gas. The first and second air fuel ratio sensors 22, 24 detect the air fuel ratio of the exhaust gas. Here, note that an arrow in FIG. 1 shows the direction of the flow of the exhaust gas in the exhaust pipe 2.

The EHC 1 is provided with a catalyst carrier 3, a case 4, a mat 5, an inner pipe 6, and electrodes 7. The catalyst carrier 3 is formed in the shape of a circular column, and is disposed in such a manner that a central axis thereof is in alignment with a central axis A of the exhaust pipe 2. A three-way catalyst 13 is carried or supported by the catalyst carrier 3. Here, note that the catalyst supported on the catalyst carrier 3 is not limited to the three-way catalyst, but may be an oxidation catalyst, an NOx storage reduction catalyst, or an NOx selective reduction catalyst.

The catalyst carrier 3 is formed of a material which, when electrically energized, becomes an electric resistance to generate heat. As a material for the catalyst carrier 3, there can be mentioned SiC by way of example. The catalyst carrier 3 has a plurality of passages which extend in a direction in which the exhaust gas flows (i.e., the direction of the central axis A), and which have a cross section of honeycomb shape vertical to the direction in which the exhaust gas flows. The exhaust gas flows through these passages. Here, note that the cross sectional shape of the catalyst carrier 3 in the direction orthogonal to the central axis A may also be elliptical, etc. The central axis A is a common central axis with respect to the exhaust pipe 2, the catalyst carrier 3, the inner pipe 6, and the case 4.

The catalyst carrier 3 is contained in the case 4. An electrode chamber 9 is formed inside the case 4. Here, note that the details of the electrode chamber 9 will be described later. One pair of electrodes 7 are connected to the catalyst carrier 3 through the electrode chamber 9 from left and right directions. Electricity is supplied to the electrodes 7 from a battery through an supply power control unit 25. When electricity is supplied to the electrodes 7, the catalyst carrier 3 is electrically energized. When the catalyst carrier 3 generates heat by energization thereof, the three-way catalyst 13 supported by the catalyst carrier 3 is heated, so that the activation thereof is facilitated.

The case 4 is formed of metal. As a material which forms the case 4, there can be mentioned a stainless steel material by way of example. The case 4 has a containing portion 4a which is constructed to include a curved surface parallel to the central axis A, and tapered portions 4b, 4c which serve to connect the containing portion 4a and the exhaust pipe 2 with each other at the upstream side and at the downstream side, respectively, of the containing portion 4a. The containing portion 4a has a channel cross section which is larger than that of the exhaust pipe 2, and the catalyst carrier 3, the mat 5 and the inner pipe 6 are contained in the inside of the containing portion 4a. The tapered portions 4b, 4c each take a tapered shape of which the channel cross section decreases in accordance with the increasing distance thereof from the containing portion 4a.

The mat 5 is inserted between an inner wall surface of the containing portion 4a of the case 4, and an outer peripheral surface of the catalyst carrier 3. In other words, inside the case 4, the catalyst carrier 3 is supported by the mat 5. In addition, the inner pipe 6 is inserted in the mat 5. The inner pipe 6 is a tubular member with the central axis A being located as a center thereof. The mat 5 is arranged to sandwich or clamp the inner pipe 6 therein, whereby it is divided into a portion at the side of the case 4 and a portion at the side of the catalyst carrier 3 by means of the inner pipe 6.

The mat 5 is formed of an electrically insulating material. As a material which forms the mat 5, there can be mentioned, by way of example, a ceramic fiber which includes alumina as a main component. The mat 5 is wound around the outer peripheral surface of the catalyst carrier 3 and the outer peripheral surface of the inner pipe 6. In addition, the mat 5 is divided into an upstream side portion 5a and a downstream side portion 5b, with a space being formed between the upstream side portion 5a and the downstream side portion 5b. Due to the insertion of the mat 5 between the catalyst carrier 3 and the case 4, it is possible to suppress electricity from flowing to the case 4 at the time when the catalyst carrier 3 is electrically energized.

The inner pipe 6 is formed of a stainless steel material. In addition, an electrically insulating layer is formed on the entire surface of the inner pipe 6. As a material which forms the electrically insulating layer, ceramic or glass can be mentioned by way of example. Here, note that the main body of the inner pipe 6 may be formed of an electrically insulating material such as alumina or the like. In addition, as shown in FIG. 1, the inner pipe 6 has a length in the direction of the central axis A longer than that of the mat 5. As a result, the inner pipe 6 has an upstream side end and a downstream side end thereof protruding from an upstream side end face and a downstream side end face of the mat 5, respectively.

Figure 2:
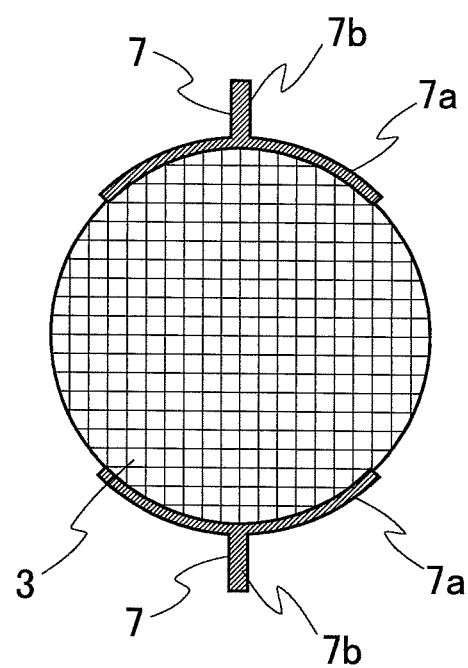
FIG. 2 is a view showing the arrangement of electrodes with respect to a catalyst carrier in the EHC according to the first embodiment.

The pair of electrodes 7 is connected to the outer peripheral surface of the catalyst carrier 3. FIG. 2 is a view showing the arrangement of the electrodes 7 with respect to the catalyst carrier 3. FIG. 2 is a cross sectional view at the time of cutting the catalyst carrier 3 and the electrodes 7 in a direction crossing at right angles to an axial direction. Each electrode 7 is formed of a surface electrode 7a and a shaft electrode 7b. The surface electrode 7a extends along the outer peripheral surface of the catalyst carrier 3 in a circumferential direction and in the axial direction. In addition, the surface electrodes 7a are arranged on the outer peripheral surface of the catalyst carrier 3 in such a manner that they are mutually opposed to each other with the catalyst carrier 3 being sandwiched therebetween. Each shaft electrode 7b has one end thereof connected to a corresponding surface electrode 7a. And, each shaft electrode 7b has the other end thereof protruded to the outside of the case 4 through the electrode chamber 9.

The case 4 and the inner pipe 6 have through holes 4d, 6c opened therein so as to allow the shaft electrodes 7b to pass through them, respectively. Then, the electrode chamber 9 is formed by a space between the upstream side portion 5a and the downstream side portion 5b of the mat 5 in the case 4. In other words, in this embodiment, the electrode chamber 9 is formed over the entire circumference of the outer peripheral surface of the catalyst carrier 3 between the upstream side portion 5a and the downstream side portion 5b of the mat 5. Here, note that spaces, each of which becomes an electrode chamber, may be formed by forming through holes only in those portions of the mat 5 through which the electrodes 7 pass, without dividing the mat 5 into the upstream side portion 5a and the downstream side portion 5b.

Electrode support members 8, which serve to support the shaft electrodes 7b, respectively, are arranged or inserted in the through holes 4d which are opened in the case 4. These electrode support members 8 are each formed of an electrically insulating material, and are fitted with no gap between the case 4 and the electrodes 7.

The shaft electrodes 7b have the other ends thereof electrically connected to the battery (not shown) through the supply power control unit 25. Electricity is supplied to the electrodes 7 from the battery. When electricity is supplied to the electrodes 7, the catalyst carrier 3 is electrically energized. When the catalyst carrier 3 generates heat by energization thereof, the three-way catalyst 13 supported by the catalyst carrier 3 is heated, so that the activation thereof is facilitated. The supply power control unit 25 serves to switch on and off the supply of electricity to the electrodes 7 (i.e., energization to the catalyst carrier 3), and to adjust the electric power to be supplied thereto.

The supply power control unit 25 is electrically connected to an electronic control unit (ECU) 20 which is provided in combination with the internal combustion engine 10. In addition, the throttle valve 14 and fuel injection valves (not shown) of the internal combustion engine 10 are electrically connected to the ECU 20, too. Thus, these parts are controlled by the ECU 20.

In addition, the air flow meter 12, the first temperature sensor 21, the second temperature sensor 23, and the first air fuel ratio sensor 22, and the second air fuel ratio sensor 24 are electrically connected to the ECU 20. The output values (signals) of these sensors are inputted to the ECU 20.

Here, note that in this embodiment, the catalyst carrier 3 corresponds to a heat generation element according to the present invention. However, the heat generation element according to the present invention is not limited to a carrier which supports a catalyst, but instead the heat generation element may be a structure which is arranged at the upstream side of a catalyst, for example.

[Deterioration Suppression of the Electrodes]

When a difference in temperature occurs on the surfaces or in the insides of the surface electrodes 7a, accompanying a rapid change in the temperature of the EHC 1, thermal stress will be applied to the surface electrodes 7a. As a result, fine cracks may occur in the surface electrodes 7a. In addition, the oxidation of the surface electrodes 7a is promoted due to their high temperatures. As a result, there may occur a portion in which the degree of oxidation thereof is higher locally than that of its surroundings.

When deterioration due to such cracks and oxidation progresses to create a portion which has a high degree of deterioration locally in the surface electrodes 7a, an electric resistance value will increase in that portion. In that case, the distribution of supplied electric power in the catalyst carrier 3 becomes nonuniform. As a result, a temperature distribution in the catalyst carrier 3 becomes nonuniform. When the temperature distribution in the catalyst carrier 3 becomes nonuniform, a difference in temperature will also occur in the three-way catalyst 13 supported by the catalyst carrier 3. For that reason, there will be a fear that the purification capacity or performance of the EHC 1 may be decreased. In addition, there will also be a fear that the deterioration of the catalyst carrier 3 may be promoted by the thermal stress generated resulting from the difference in temperature in the catalyst carrier 3.

Accordingly, in this embodiment, in order to suppress the deterioration of the surface electrodes 7a, the electric power supplied to the catalyst carrier 3 through the electrodes 7 is controlled according to the degree of deterioration of the surface electrodes 7a. That is, in cases where the degree of deterioration of the surface electrodes 7a becomes high, the electric power supplied to the catalyst carrier 3 is decreased. By decreasing the electric power supplied to the catalyst carrier 3, it prevents cracks in the surface electrodes 7a from being enlarged in size and increased in number. That is, the further deterioration of the surface electrodes can be suppressed.

In addition, in cases where the electric power supplied to the catalyst carrier 3 has been decreased, the control to increase the amount of heat supplied to the EHC 1 by the exhaust gas is carried out in combination with this. According to this, even if the electric power to be supplied to the catalyst carrier 3 is decreased, it is possible to raise the temperature of the EHC 1 to a sufficient extent. In other words, it is possible to suppress the reduction of the exhaust gas purification performance of the EHC 1 due to a fall of the temperature thereof. For that reason, the deterioration of exhaust characteristics can be suppressed.

In this embodiment, the number of times (frequency) that a condition was satisfied in which a difference in temperature between two points located at a predetermined distance from each other on the surfaces or in the insides of the surface electrodes 7a (hereinafter, may also simply be referred to as an electrode temperature difference) exceeds a predetermined temperature difference, and a maximum oxygen storage amount, which is a maximum value of an amount of oxygen which can be retained or held in the three-way catalyst 13, are detected as the degree of deterioration of the surface electrodes 7a.

The frequency in which the electrode temperature difference exceeded the predetermined temperature difference is in a correlation with the degree of deterioration due to the cracks in the surface electrodes 7a. That is, the more the frequency in which the electrode temperature difference exceeded the predetermined temperature difference, the larger in size the cracks in the surface electrodes 7a become, or the more the number of the cracks increases. Here, the "predetermined distance" and the "predetermined temperature difference" are values with which when the difference in temperature between the two points located at the predetermined distance from each other on the surfaces or in the insides of the surface electrodes 7a exceeds the predetermined temperature difference, it can be judged that cracks will occur in the surface electrodes 7a due to thermal stress.

Moreover, under the condition in which the oxidation of the surface electrodes 7a progresses, sintering of the three-way catalyst 13 supported by the catalyst carrier 3 also progresses. Then, the higher the degree of the progress of the sintering of the three-way catalyst 13, the smaller becomes the maximum oxygen storage amount of the three-way catalyst 13. For that reason, the maximum oxygen storage amount of the three-way catalyst 13 is in a correlation with the degree of deterioration due to the oxidation in the surface electrodes 7a. In other words, it can be judged that the smaller the maximum oxygen storage amount of the three-way catalyst 13, the higher is the degree of progress of the oxidation of the surface electrodes 7a.

Accordingly, as parameters which indicate the degree of deterioration of the surface electrodes 7a, there can be used the frequency in which the condition was satisfied in which the electrode temperature difference exceeds the predetermined temperature difference, and the maximum oxygen storage amount of the three-way catalyst 13.

Here, reference will be made to a method for calculating the frequency in which the condition was satisfied in which the electrode temperature difference exceeds the predetermined temperature difference. When the internal combustion engine 10 is cold started, the temperature of the EHC 1 is low. For that reason, when a large amount of heat is supplied to the EHC 1 for a short period of time at the time of cold start of the internal combustion engine 10, a large difference in temperature will be generated on the surfaces or in the insides of the surface electrodes 7a. Accordingly, in this embodiment, the condition in which the electrode temperature difference exceeds the predetermined temperature difference is assumed to be such that the internal combustion engine 10 is cold started and an integrated value of the amount of heat supplied to the EHC 1 (hereinafter, may also simply be referred to as a supplied heat amount integrated value) in a period of time from the engine starting until a predetermined period of time has passed exceeds a predetermined value. That is, the frequency in which the internal combustion engine 10 was cold start and in which the supplied heat amount integrated value exceeded the predetermined value is calculated as the frequency in which the condition was satisfied in which the electrode temperature difference exceeds the predetermined temperature difference.

Figure 3:
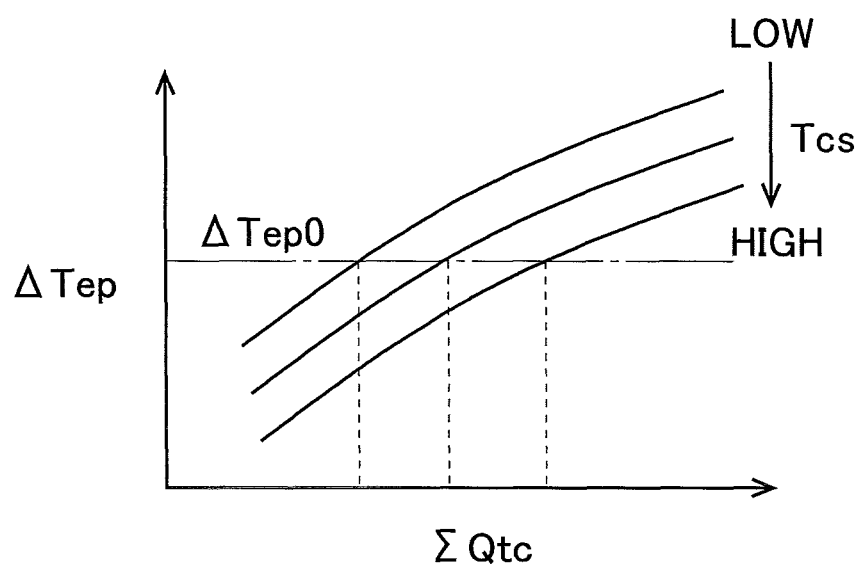
FIG. 3 is a view showing the relation among an integrated value of an amount of supplied heat $\Sigma Qtc$, an electrode temperature difference $\Delta Tep$, and a temperature Tcs of the EHC immediately before engine starting, at the time when the internal combustion engine is cold started, according to the first embodiment.

Here, the "predetermined period of time" and the "predetermined value" are values with which it can be judged that there occurs a difference in temperature between the two points located at the predetermined distance from each other on the surfaces or in the insides of the surface electrodes 7a to such an extent as to exceed the predetermined temperature difference. FIG. 3 is a view showing the relation among an integrated value of an amount of supplied heat (a supplied heat amount integrated value) $\Sigma Qtc$, an electrode temperature difference $\Delta Tep$, and a temperature $Tcs$ of the EHC 1 immediately before engine starting, at the time when the internal combustion engine 10 is cold started. In FIG. 3, $\Delta Tep0$ represents an upper limit value of a permissible electrode temperature difference, i.e., the predetermined temperature difference.

As shown in FIG. 3, the lower the temperature Tcs of the EHC 1 immediately before engine starting, the smaller becomes the supplied heat amount integrated value ΣQtc at which the electrode temperature difference ΔTep exceeds the predetermined temperature difference ΔTep0. Accordingly, in this embodiment, when the internal combustion engine 10 has been cold started, the predetermined value ΣQtcmax is calculated based on the temperature Tcs of the EHC 1 immediately before engine starting. Then, in cases where the supplied heat amount integrated value ΣQtc exceeds the predetermined value ΣQtcmax, it is judged that the condition was satisfied in which the electrode temperature difference exceeds the predetermined temperature difference, and a counter for counting the frequency thereof is incremented by 1.

Figure 4:
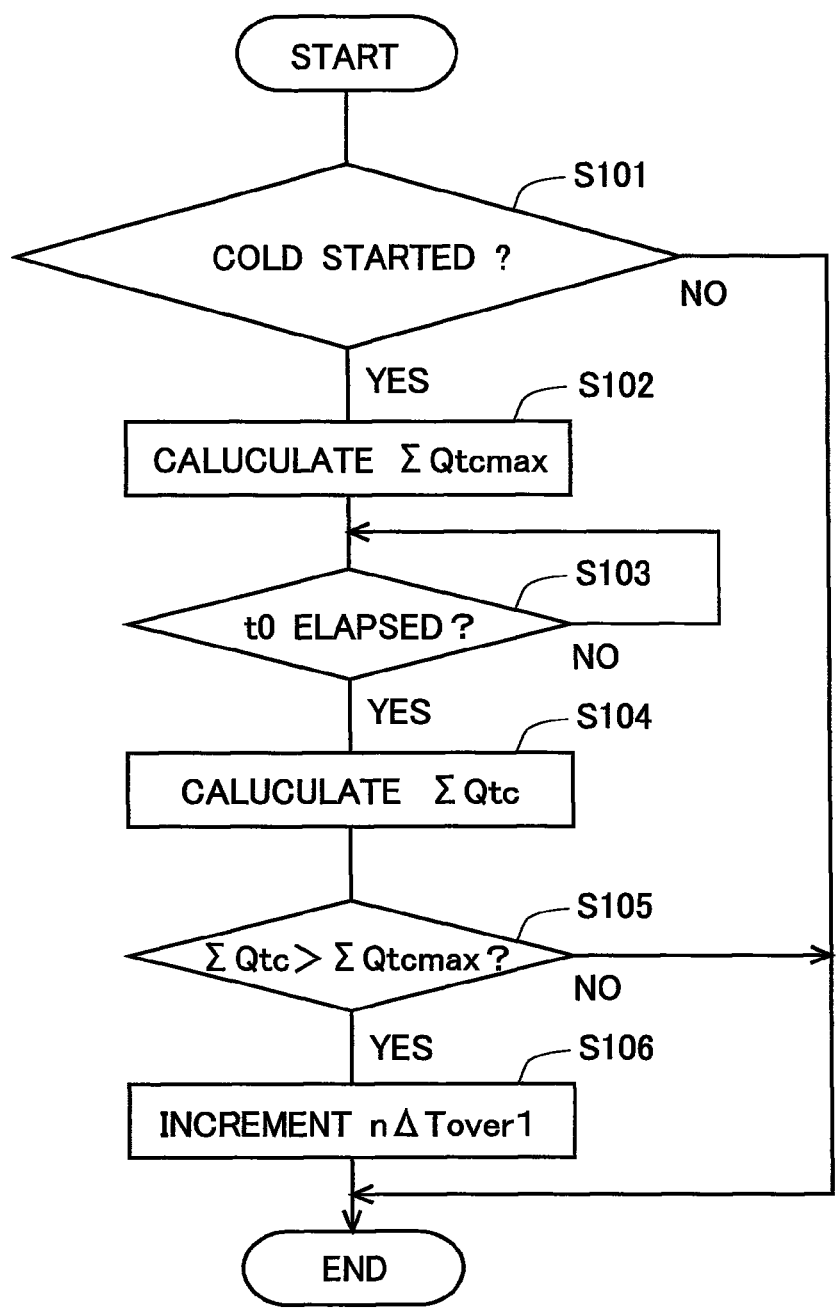
FIG. 4 is a flow chart showing a flow for counting the number of times (frequency) that a condition was satisfied in which the electrode temperature difference exceeds a predetermined temperature difference, according to the first embodiment.

FIG. 4 is a flow chart showing a flow for counting the number of times (frequency) that the condition was satisfied in which the electrode temperature difference exceeds the predetermined temperature difference. This flow has been beforehand stored in the ECU 20, and is carried out in a repeated manner by the ECU 20 each time the internal combustion engine 10 is started.

In this flow, first, in step S101, it is determined whether the internal combustion engine 10 has been cold started. For example, in cases where the temperature of the cooling water is equal to or less than a predetermined temperature at the time of starting of the internal combustion engine 10, a judgment may be made that the internal combustion engine 10 has been cold started. When a negative determination is made in step S101, the execution of this flow is once ended. In this case, in the current engine starting, the counter, which counts the frequency nΔTover in which the condition was satisfied in which the electrode temperature difference exceeds the predetermined temperature difference, is not incremented.

On the other hand, in cases where an affirmative determination is made in step S101, the processing of step S102 is then carried out. In step S102, the predetermined value ΣQtcmax is calculated based on the temperature Tcs of the EHC 1 immediately before engine starting. In this embodiment, the relation between the temperature Tcs of the EHC 1 immediately before the engine starting and the predetermined value ΣQtcmax, as shown in FIG. 3, has been obtained through experiments, etc., in advance, and stored in the ECU 20 as a map or a function. In step S102, the predetermined value ΣQtcmax is calculated by using this map or function. Here, note that the temperature Tcs of the EHC 1 can be estimated based on a detected value of the first temperature sensor 21 and/or the second temperature sensor 23.

Subsequently, in step S103, it is determined whether a predetermined period of time t0 has elapsed from the engine starting. The predetermined period of time t0 has been beforehand set based on experiments, etc. In cases where a negative determination is made in step S103, the processing of the step S103 is carried out again.

On the other hand, in cases where an affirmative determination is made in step S103, the processing of step S104 is then carried out. In step S104, the supplied heat amount integrated value ΣQtc is calculated. The amount of heat supplied to the EHC 1 can be calculated based on the temperature and the flow rate of the exhaust gas flowing into the EHC 1. Then, the supplied heat amount integrated value ΣQtc can be calculated by integrating the amount of heat thus calculated from the engine starting until the predetermined period of time t0 has elapsed. Here, note that the temperature of the exhaust gas flowing into the EHC 1 can be detected by the first temperature sensor 21. In addition, the flow rate of the exhaust gas flowing into the EHC 1 can be estimated based on an amount of intake air detected by the air flow meter 12.

Then, in step S105, it is determined whether the supplied heat amount integrated value ΣQtc is larger than the predetermined value ΣQtcmax. When a negative determination is made in step S105, the execution of this flow is once ended. In this case, in the current engine starting, the counter, which counts the frequency nΔTover in which the condition was satisfied in which the electrode temperature difference exceeds the predetermined temperature difference, is not incremented.

On the other hand, in cases where an affirmative determination is made in step S105, the processing of step S106 is then carried out. In step S106, the counter, which counts the frequency nΔTover in which the condition was satisfied in which the electrode temperature difference exceeds the predetermined temperature difference, is incremented by 1.

Here, note that the frequency nΔTover, in which the condition was satisfied in which the electrode temperature difference exceeds the predetermined temperature difference, is counted with an initial state of the EHC 1 (i.e., a state in which the EHC 1 was first mounted on the vehicle) being set as zero. In addition, the frequency nΔTover in which the condition was satisfied in which the electrode temperature difference exceeds the predetermined temperature difference is stored in the ECU 20.

Figure 5:
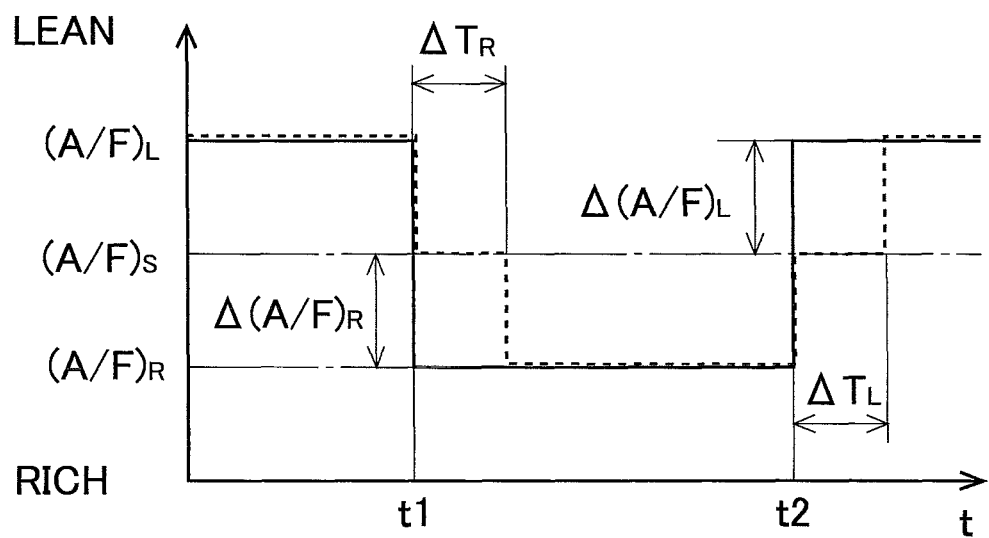
FIG. 5 is a time chart showing the changes over time of air fuel ratios of an exhaust gas flowing into the EHC and an exhaust gas flowing out of the EHC when an air fuel ratio of an air fuel mixture in the internal combustion engine was changed from a lean air fuel ratio to a rich air fuel ratio, and then changed from a rich air fuel ratio to a lean air fuel ratio, according to the first embodiment.

Now, reference will be made to a calculation method for the maximum oxygen storage amount of the three-way catalyst 13. FIG. 5 is a time chart showing the changes over time of air fuel ratios of an exhaust gas flowing into the EHC 1 (hereinafter, may also simply referred to as an inflowing exhaust gas) and an exhaust gas flowing out of the EHC 1 (hereinafter, may also simply referred to as an outflowing exhaust gas) when an air fuel ratio of an air fuel mixture in the internal combustion engine 10 was changed from a lean air fuel ratio to a rich air fuel ratio, and then changed from a rich air fuel ratio to a lean air fuel ratio. In FIG. 5, a solid line represents an air fuel ratio of the inflowing exhaust gas, and a broken line represents an air fuel ratio of the outflowing exhaust gas. Here, note that the air fuel ratio of the inflowing exhaust gas can be detected by the first air fuel ratio sensor 22, and the air fuel ratio of the outflowing exhaust gas can be detected by the second air fuel ratio sensor 24.

In FIG. 5, at a time point t1, the air fuel ratio of the air fuel mixture in the internal combustion engine 10 is changed over from a lean air fuel ratio $(A/F)_L$ to a rich air fuel ratio $(A/F)_R$, whereby the air fuel ratio of the inflowing exhaust gas changes from the lean air fuel ratio $(A/F)_L$ to the rich air fuel ratio $(A/F)_R$. At this time, the air fuel ratio of the outflowing exhaust gas changes from the lean air fuel ratio $(A/F)_L$ up to a stoichiometric air fuel ratio $(A/F)_S$, then is maintained at the stoichiometric air fuel ratio $(A/F)_S$ for a period of time $\Delta T_R$, and thereafter changes up to the rich air fuel ratio $(A/F)_R$.

In addition, in FIG. 5, at a time point t2, the air fuel ratio of the air fuel mixture in the internal combustion engine 10 is changed over from the rich air fuel ratio $(A/F)_R$ to the lean air fuel ratio $(A/F)_L$, whereby the air fuel ratio of the outflowing exhaust gas changes from the rich air fuel ratio $(A/F)_R$ to the lean air fuel ratio $(A/F)_L$. At this time, the air fuel ratio of the outflowing exhaust gas changes from the rich air fuel ratio $(A/F)_R$ up to the stoichiometric air fuel ratio $(A/F)_S$, then is maintained at the stoichiometric air fuel ratio $(A/F)_S$ for a period of time $\Delta T_L$, and thereafter changes up to the rich air fuel ratio $(A/F)_R$.

In this manner, at the time when the air fuel ratio of the air fuel mixture in the internal combustion engine 10 is changed over from one of the rich air fuel ratio (A/F)$_R$ and the lean air fuel ratio (A/F)$_L$ to the other, the air fuel ratio of the outflowing exhaust gas is maintained at the stoichiometric air fuel ratio (A/F)$_S$ for the period of time $\Delta T_R$ or the period of time $\Delta T_L$, due to an O$_2$ storage function which the three-way catalyst 13 has. For that reason, the maximum oxygen storage amount of the three-way catalyst 13 can be calculated based on $\Delta$(A/F)$_R$, which is a difference between the stoichiometric air fuel ratio (A/F)$_S$ and the rich air fuel ratio (A/F)$_R$, the period of time $\Delta T_R$, and the amount of intake air sucked into the internal combustion engine 10 during the lapse of the period of time $\Delta T_R$, or based on $\Delta$(A/F)$_L$, which is a difference between the lean air fuel ratio (A/F)$_L$ and the stoichiometric air fuel ratio (A/F)$_S$, the period of time $\Delta T_L$, and the amount of intake air sucked into the internal combustion engine 10 during the lapse of the period of time $\Delta T_L$.

In other words, the maximum oxygen storage amount Cmax of the three-way catalyst 13 can be calculated by using the following equation (1) or (2).

$$C\text{max} = \alpha \cdot \Delta(A/F)_R \cdot Ga \cdot \Delta T_R \quad \text{Expression (1)}$$

$$C\text{max} = \alpha \cdot \Delta(A/F)_L \cdot Ga \cdot \Delta T_L \quad \text{Expression (2)}$$

Here, note that in above-mentioned expressions (1) and (2), $\alpha$ is a predetermined coefficient, and Ga is the amount of intake air in the internal combustion engine 10.

In this embodiment, in the operation of the internal combustion engine 10, the maximum oxygen storage amount Cmax of the three-way catalyst 13 is calculated by means of the above-mentioned method, and is stored into the ECU 20.

Here, note that in this embodiment, as the calculation method for the frequency in which the condition was satisfied in which the electrode temperature difference exceeds the predetermined temperature difference, and as the calculation method for the maximum oxygen storage amount of the three-way catalyst 13, there can be adopted well-known methods other than the above-mentioned methods.

Figure 6:
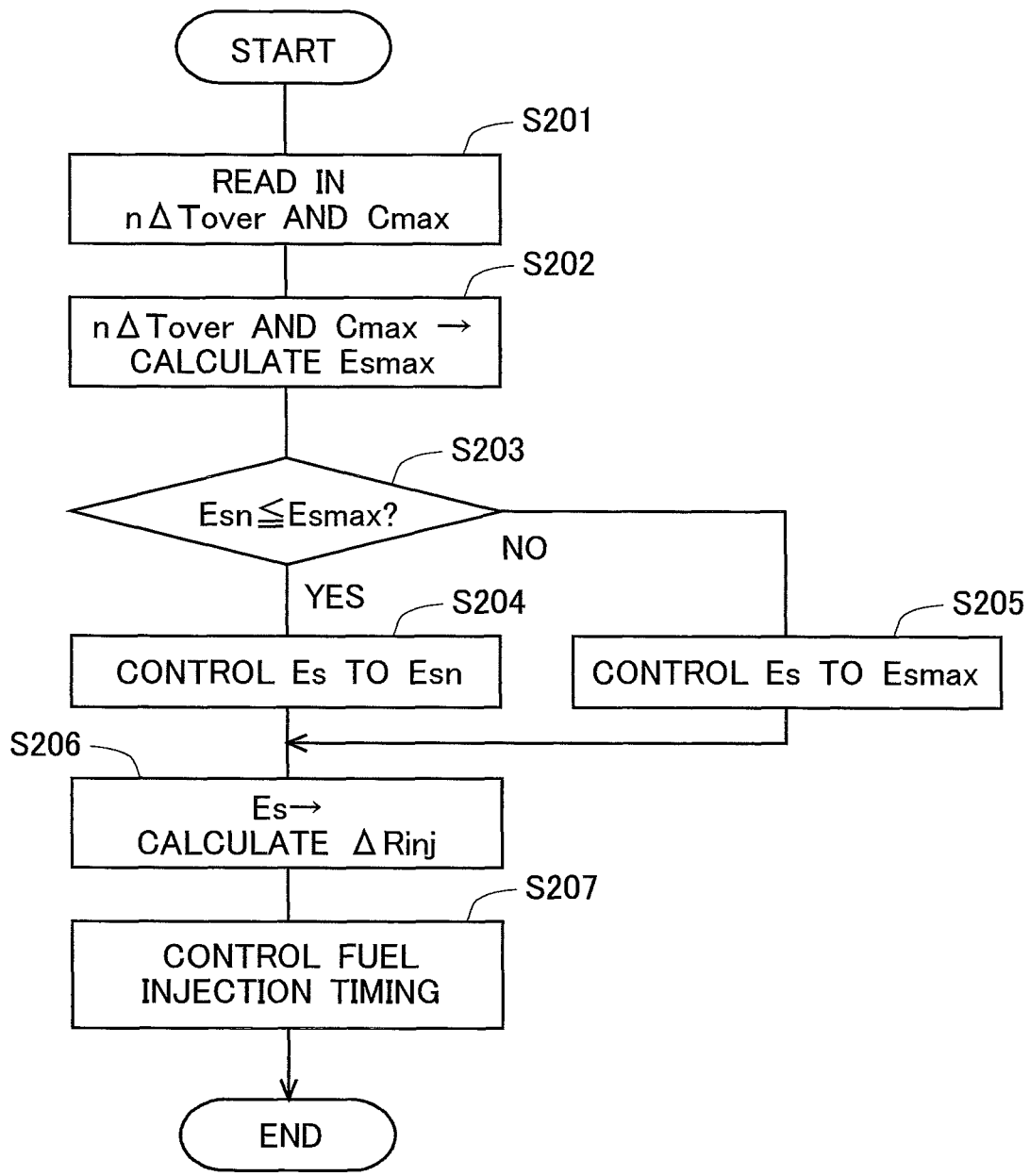
FIG. 6 is a flow chart showing a flow for deterioration suppression control of surface electrodes according to the first embodiment.

Next, reference will be made to a flow for the deterioration suppression control of the surface electrodes according to this embodiment, based on FIG. 6. FIG. 6 is a flow chart showing a flow for the deterioration suppression control of the surface electrodes according to this embodiment. This flow has been beforehand stored in the ECU 20, and is executed by the ECU 20 in a repeated manner.

In this flow, first, in step S201, there are read in the frequency n$\Delta$Tover in which the condition was satisfied in which the electrode temperature difference exceeds the predetermined temperature difference, and the maximum oxygen storage amount Cmax of the three-way catalyst 13, which have been calculated according to the above-mentioned methods and stored in the ECU 20.

Then, in step S202, an upper limit value Esmax of the electric power supplied to the catalyst carrier 3 through the electrodes 7 at the current point in time (hereinafter, may also simply be referred to as a supply power) is calculated based on the frequency n$\Delta$Tover in which the condition was satisfied in which the electrode temperature difference exceeds the predetermined temperature difference, and the maximum oxygen storage amount Cmax of the three-way catalyst 13. The upper limit value Esmax of the supply power is a threshold value of the supply power at which it can be judged that an increase in size and an increase in number of the cracks in the surface electrodes 7a can be suppressed.

Figure 7:
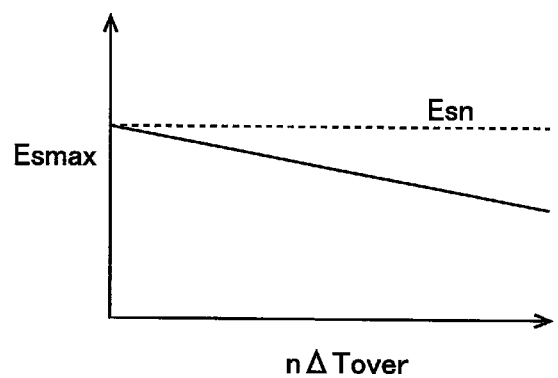
FIG. 7 is a view showing the relation between the number of times (frequency) $n\Delta Tover$ that the condition was satisfied in which the electrode temperature difference exceeds the predetermined temperature difference and an upper limit value Esmax of a supply power, according to the first embodiment.
Figure 8:
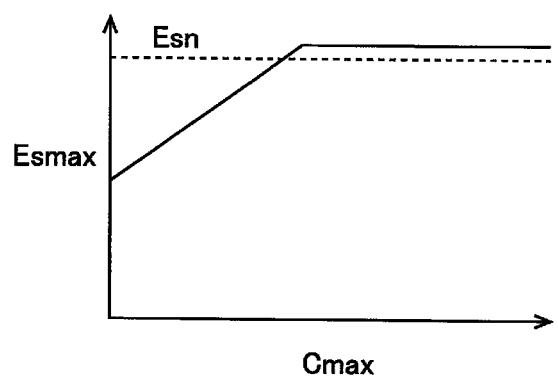
FIG. 8 is a view showing the relation between a maximum oxygen storage amount Cmax of a three-way catalyst and the upper limit value Esmax of the supply power according to the first embodiment.

FIG. 7 is a view showing the relation between the number of times (frequency) n$\Delta$Tover that the condition was satisfied in which the electrode temperature difference exceeds the predetermined temperature difference and the upper limit value Esmax of the supply power. In addition, FIG. 8 is a view showing the relation between the maximum oxygen storage amount Cmax of the three-way catalyst 13 and the upper limit value Esmax of the supply power. Here, note that in FIGS. 7 and 8, broken lines represent a standard value Esn of the supply power set in advance.

As shown in FIG. 7, the upper limit value Esmax of the supply power decreases as the frequency n$\Delta$Tover increases in which the condition was satisfied in which the electrode temperature difference exceeds the predetermined temperature difference. In addition, as shown in FIG. 8, when the maximum oxygen storage amount Cmax of the three-way catalyst 13 decreases to a certain amount, the upper limit value Esmax of the supply power decreases as the maximum oxygen storage amount Cmax decreases.

In the ECU 20, the relation among the frequency n$\Delta$Tover in which the condition was satisfied in which the electrode temperature difference exceeds the predetermined temperature difference, the maximum oxygen storage amount Cmax of the three-way catalyst 13, and the upper limit value Esmax of the supply power, as shown in FIGS. 7 and 8, has been determined in advance through experiments or the like, and stored in the ECU 20 as a map or a function. In step S202, the upper limit value Esmax of the supply power is calculated by the use of this map or function.

Subsequently, in step S203, it is determined whether the standard value Esn of the supply power is equal to or less than the upper limit value Esmax of the supply power at the current point in time calculated in step S203. In step S203, when an affirmative determination is made, the processing of step S204 is then carried out, whereas when a negative determination is made, the processing of step S205 is then carried out.

In step S204, the supply power Es is controlled by the standard value Esn thereof by the supply power control unit 25. On the other hand, in step S205, the supply power Es is controlled to the upper limit value Esmax by means of the supply power control unit 25. Subsequent to step S204 or S205, the processing of step S206 is carried out.

In step S206, an amount of retardation $\Delta$Rinj from compression stroke top dead center of fuel injection timing in the internal combustion engine 10 is calculated based on the supply power Es which has been controlled in step S204 or S205.

Figure 9:
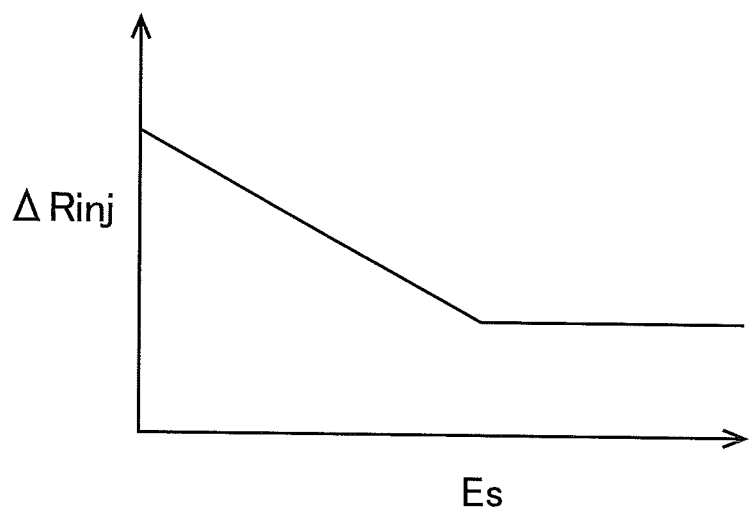
FIG. 9 is a view showing the relation between a supply power Es and an amount of retardation $\Delta Rinj$ from compression stroke top dead center of fuel injection timing in the internal combustion engine 1 according to the first embodiment.

FIG. 9 is a view showing the relation between the supply power Es and the amount of retardation $\Delta$Rinj of the fuel injection timing. As shown in FIG. 9, the smaller the supply power Es, the larger becomes the amount of retardation $\Delta$Rinj of the fuel injection timing. The relation between the supply power Es and the amount of retardation $\Delta$Rinj of the fuel injection timing, as shown in FIG. 9, has been determined in advance through experiments or the like, and stored in the ECU 20 as a map or a function. In step S206, the amount of retardation $\Delta$Rinj of the fuel injection timing is calculated by the use of this map or function.

Subsequently, in step S207, the fuel injection timing in the internal combustion engine 10 is controlled based on the amount of retardation $\Delta$Rinj calculated in step S206. In other words, the fuel injection timing in the internal combustion engine 10 is controlled to a timing which is retarded by the amount of retardation $\Delta$Rinj from the compression stroke top dead center.

According to the above-mentioned flow, the larger the frequency n$\Delta$Tover in which the condition was satisfied in which the electrode temperature difference exceeds the predetermined temperature difference, the smaller the supply power Es is made. In addition, the smaller the maximum oxygen storage amount Cmax of the three-way catalyst 13, the smaller the supply power Es is made. In other words, the higher the degree of deterioration of the surface electrodes 7a, the smaller the supply power Es is made. According to this, it is possible to suppress the cracks in the surface electrodes 7a from being enlarged in size and increased in number.

In addition, according to the above-mentioned flow, the lower the supply power Es becomes, the larger the amount of retardation ΔRinj from the compression stroke top dead center of the fuel injection timing in the internal combustion engine 10 is made. The larger the amount of retardation ΔRinj of fuel injection timing, the higher the temperature of the exhaust gas becomes. In other words, the lower the supply power Es becomes, the more the amount of heat supplied to the EHC 1 by the exhaust gas is increased. As a result of this, even if the supply power Es is made lower, it is possible to raise the temperature of the EHC 1 to a sufficient extent.

Here, note that in cases where the amount of heat to be supplied to the EHC 1 by the exhaust gas is increased, the amount of retardation from the compression stroke top dead center of the fuel injection timing in the internal combustion engine 10 may be made constant, and the period of time in which the retardation of the fuel injection timing is carried out may also be made longer as the supply power Es becomes lower. According to this, too, the lower the supply power Es becomes, the more the amount of heat supplied to the EHC 1 by the exhaust gas can be increased.

Moreover, in this embodiment, as the method of increasing the amount of heat supplied to the EHC 1 by the exhaust gas, there is adopted a method of retarding the fuel injection timing in the internal combustion engine 10. However, the amount of heat supplied to the EHC 1 by the exhaust gas may be made to increase by means of other well-known methods.

Further, in this embodiment, the supply power is controlled based on both the frequency in which the condition was satisfied in which the electrode temperature difference exceeds the predetermined temperature difference and the maximum oxygen storage amount of the three-way catalyst 13. However, the supply power may be controlled based on only the frequency which is in a correlation with the degree of deterioration of the surface electrodes 7a due to the cracks therein, and in which the condition was satisfied in which the electrode temperature difference exceeds the predetermined temperature difference. But, the deterioration of the surface electrodes 7a can be further suppressed by controlling the supply power based on both the frequency in which the condition was satisfied in which the electrode temperature difference exceeds the predetermined temperature difference and the maximum oxygen storage amount of the three-way catalyst 13.

[First Modification]

Reference will be made to a first modification of this embodiment based on FIGS. 10 through 12. In this modification, the degree of deterioration of the surface electrodes 7a is calculated based on the frequency in which the condition was satisfied in which the electrode temperature difference exceeds the predetermined temperature difference, and the maximum oxygen storage amount of the three-way catalyst 13. Then, the supply power is controlled based on the degree of deterioration of the surface electrodes 7a thus calculated.

Figure 10:
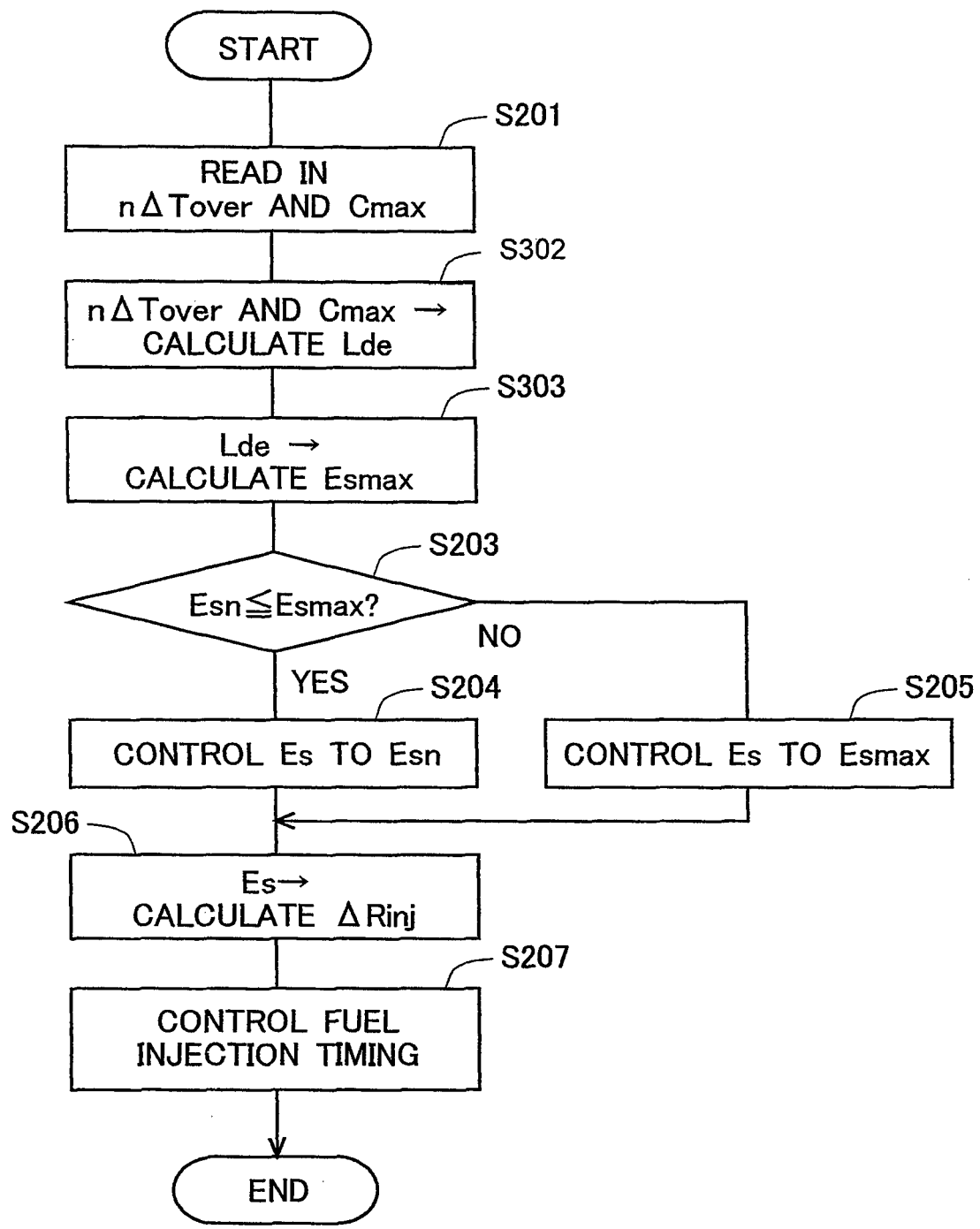
FIG. 10 is a flow chart showing a flow for deterioration suppression control of surface electrodes according to a modification of the first embodiment.

FIG. 10 is a flow chart showing a flow for the deterioration suppression control of the surface electrodes according to this modification. This flow has been beforehand stored in the ECU 20, and is executed by the ECU 20 in a repeated manner. Here, note that this flow is such that the step S202 in the flow shown in FIG. 6 is replaced by steps S302 and S303. For that reason, the explanation on the processing in steps other than steps S302 and S303 is omitted.

In this flow, in step S302, the degree of deterioration Lde of the surface electrodes 7a at the current point in time is calculated based on the frequency in which the condition was satisfied in which the electrode temperature difference exceeds the predetermined temperature difference nΔTover and the maximum oxygen storage amount Cmax of the three-way catalyst 13.

Figure 11:
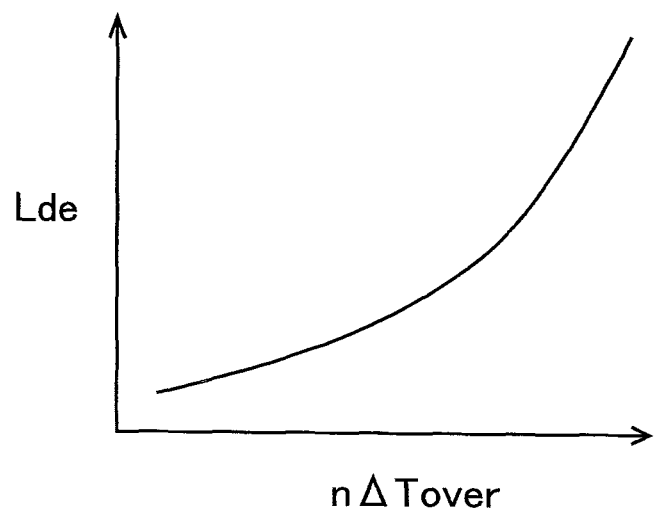
FIG. 11 is a view showing the relation between the number of times (frequency) $n\Delta Tover$ that a condition was satisfied in which an electrode temperature difference exceeds a predetermined temperature difference, and a degree of deterioration Lde of the surface electrodes according to the modification of the first embodiment.

FIG. 11 is a view showing the relation between the number of times (frequency) nΔTover that the condition was satisfied in which the electrode temperature difference exceeds the predetermined temperature difference, and the degree of deterioration Lde of the surface electrodes 7a. In addition, FIG. 12 is a view showing the relation between the maximum oxygen storage amount Cmax of the three-way catalyst 13 and the degree of deterioration Lde of the surface electrodes 7a.

As shown in FIG. 11, the degree of deterioration Lde of the surface electrodes 7a becomes larger as the frequency nΔTover increases in which the condition was satisfied in which the electrode temperature difference exceeds the predetermined temperature difference. Also, as shown in FIG. 12, the smaller the maximum oxygen storage amount Cmax of the three-way catalyst 13, the larger is the degree of deterioration Lde of the surface electrodes 7a.

Figure 12:
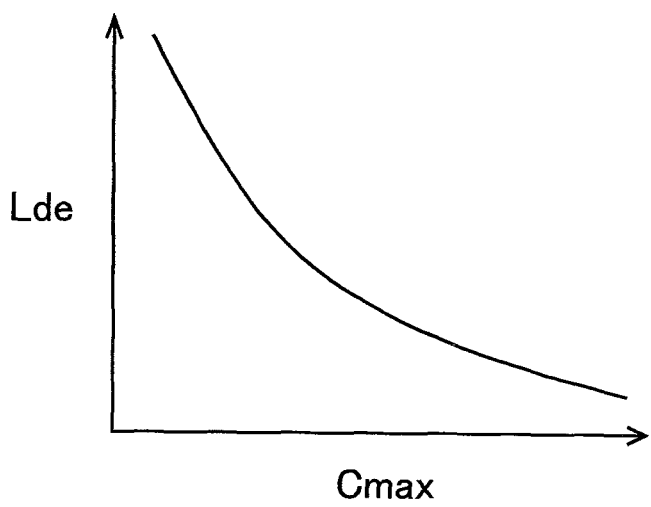
FIG. 12 is a view showing the relation between a maximum oxygen storage amount Cmax of a three-way catalyst and the degree of deterioration Lde of the surface electrodes according to the modification of the first embodiment.

In the ECU 20, the relation among the frequency nΔTover in which the condition was satisfied in which the electrode temperature difference exceeds the predetermined temperature difference, the maximum oxygen storage amount Cmax of the three-way catalyst 13, and the degree of deterioration Lde of the surface electrodes 7a, as shown in FIGS. 11 and 12, has been determined in advance through experiments or the like, and stored in the ECU 20 as a map or a function. In step S302, the degree of deterioration Lde of the surface electrodes 7a is calculated by the use of this map or function.

Subsequently, in step S303, the upper limit value Esmax of the supply power is calculated based on the degree of deterioration Lde of the surface electrodes 7a at the current point in time calculated in step S302. Here, the upper limit value Esmax of the supply power is calculated as a smaller value, as the degree of deterioration Lde of the surface electrodes 7a is higher. Such a relation between the degree of deterioration Lde of the surface electrodes 7a and the upper limit value Esmax of the supply power has been determined in advance through experiments or the like, and stored in the ECU 20 as a map or a function. In step S303, the upper limit value Esmax of the supply power is calculated by the use of this map or function.

Here, note that in this modification, the degree of deterioration of the surface electrodes 7a is estimated based on both of the frequency in which the condition was satisfied in which the electrode temperature difference exceeds the predetermined temperature difference and the maximum oxygen storage amount of the three-way catalyst 13. However, the degree of deterioration of the surface electrodes 7a may be estimated based on only the frequency which is in a correlation with the degree of deterioration of the surface electrodes 7a due to the cracks therein, and in which the condition was satisfied in which the electrode temperature difference exceeds the predetermined temperature difference. But, the degree of deterioration of the surface electrodes 7a can be estimated with higher accuracy by using both of the frequency in which the condition was satisfied in which the electrode temperature difference exceeds the predetermined temperature difference and the maximum oxygen storage amount of the three-way catalyst 13.

Second Embodiment

The schematic construction of intake and exhaust systems and an EHC of an internal combustion engine according to this second embodiment is the same as that in the first embodiment. However, in this embodiment, the internal combustion engine 10 is adopted by a hybrid system which has a motor other than the internal combustion engine 10 as a driving source of a vehicle. And, electricity is supplied to the motor from the same battery as that which supplies electricity to the EHC 1.

In addition, in the hybrid system according to this embodiment, when an amount of stored electricity in the battery decreases to a predetermined mode change threshold value, the travel mode of the vehicle will be changed over from an EV travel mode, which is a travel mode in which only a motor is used as a driving source, to hybrid traveling which is a travel mode in which the motor and the internal combustion engine 10 are used as driving sources. At this time, before the amount of stored electricity in the battery reaches the mode change threshold value, i.e., at the time when the amount of stored electricity in the battery reaches an EHC energization start threshold value larger than the mode change threshold value, electrical energization to the EHC 1 is started. This is because the exhaust gas purification performance or ability in the EHC 1 is made to be exhibited from a point in time at which the travel mode of the vehicle has been changed over to the hybrid traveling. In other words, it is necessary to raise the temperature of the EHC 1 to a sufficient extent thereby to activate the three-way catalyst 13, by the time the travel mode of the vehicle is changed over to the hybrid traveling.

Here, in this embodiment, too, at the time when energization to the EHC 1 is carried out, the supply power is made smaller as the degree of deterioration of the surface electrodes 7a is larger, similar to the first embodiment. That is, the larger the frequency in which the condition was satisfied in which the electrode temperature difference exceeds the predetermined temperature difference, and the smaller the maximum oxygen storage amount of the three-way catalyst 13, the supply power is made smaller. However, in cases where the temperature of the EHC 1 is raised by means of electrical energization, the smaller the supply power, the longer becomes the period of time taken until the temperature of the EHC 1 rises to a sufficient extent.

Accordingly, in this embodiment, the supply power at the time of energizing the EHC 1 is calculated in advance based on both the frequency in which the condition was satisfied in which the electrode temperature difference exceeds the predetermined temperature difference and the maximum oxygen storage amount of the three-way catalyst 13. Then, the EHC energization start threshold value is changed according to the supply power thus calculated.

Figure 13:
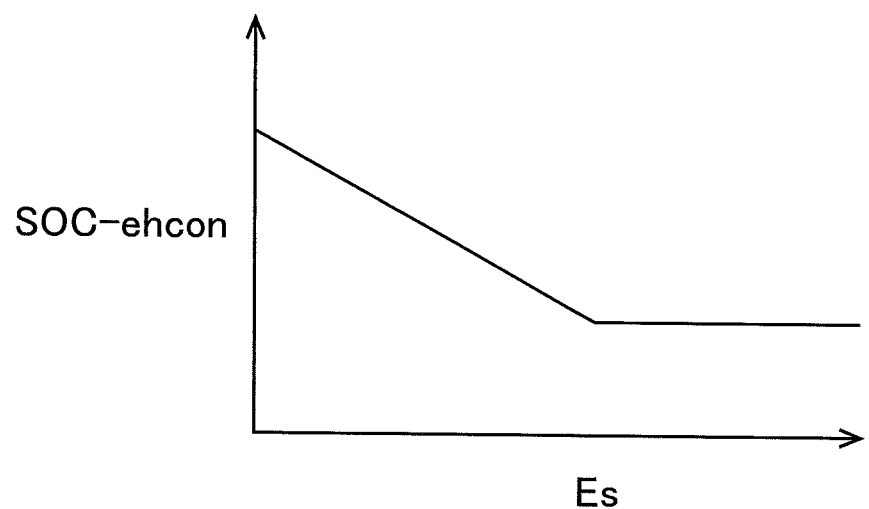
FIG. 13 is a view showing the relation between a supply power Es and an EHC energization start threshold value SOCehcon according to a second embodiment.

FIG. 13 is a view showing the relation between a supply power Es and an EHC energization start threshold value SOCehcon. As shown in FIG. 13, in this embodiment, the smaller the supply power, the larger the EHC energization start threshold value is made.

According to this, the smaller the supply power, at an earlier period of time the electrical energization to the EHC 1 is started. For that reason, even in cases where the supply power is decreased, it is becomes possible to raise the temperature of the EHC 1 to a sufficient extent, by the time the travel mode of the vehicle is changed over to the hybrid traveling.

DESCRIPTION OF THE REFERENCE SIGNS

1 . . . electric heating catalyst (EHC)
2 . . . exhaust pipe
3 . . . catalyst carrier
4 . . . case
5 . . . mat
6 . . . inner pipe
7 . . . electrodes
7a . . . surface electrodes
7b . . . shaft electrodes
10 . . . internal combustion engine
11 . . . intake pipe
12 . . . air flow meter
13 . . . three-way catalyst
20 . . . ECU
21 . . . first temperature sensor
22 . . . first air fuel ratio sensor
23 . . . second temperature sensor
24 . . . second air fuel ratio sensor
25 . . . supply power control unit

The invention claimed is:

1. A control device for an electrically heated catalyst which is arranged in an exhaust passage of an internal combustion engine, the control device comprising: a heat generation element, including a catalyst carrier or structure, and a pair of electrodes that supply electricity to said heat generation element, wherein said heat generation element is electrically energized to generate heat so that a catalyst is heated by the generation of heat;

wherein each of said pair of electrodes has a surface electrode which spreads along a surface of said heat generation element, and said surface electrodes are arranged in opposition to each other with said heat generation element being sandwiched therebetween; and an electronic control unit is configured to decrease an electric power supplied to said heat generation element, and increases an amount of heat supplied to the electrically heated catalyst by an exhaust gas, when a frequency becomes large in which a condition was satisfied in which a difference in temperature between two points located at a predetermined distance from each other on surfaces or in insides of said surface electrodes exceeds a predetermined temperature difference, as compared with when the frequency is small.

2. The control device for an electrically heated catalyst as set forth in claim 1, wherein the condition in which the difference in temperature between said two points on the surfaces or in the insides of said surface electrodes exceeds said predetermined temperature difference is such that the internal combustion engine is cold started and an integrated value of an amount of intake air in the internal combustion engine or an integrated value of the amount of heat supplied to the electrically heated catalyst, in a period of time from engine starting until a predetermined period of time has passed, exceeds a predetermined value.

3. A control device for an electrically heated catalyst as set forth in claim 1, wherein a catalyst is supported by said heat generation element; and
when a maximum oxygen storage amount of said catalyst becomes small, said electronic control unit decreases the electric power supplied to said heat generation element and increases the amount of heat supplied to said electrically heated catalyst by the exhaust gas, as compared with when the amount is large.

4. An electrode deterioration degree estimation device for an electrically heated catalyst which is arranged in an exhaust passage of an internal combustion engine, the electrode deterioration degree estimation device comprising: heat generation element, including a catalyst carrier or structure, and a pair of electrodes that supply electricity to said heat generation element, wherein said heat generation element is electrically energized to generate heat so that a catalyst is heated by the generation of heat;

wherein each of said pair of electrodes has a surface electrode which spreads along a surface of said heat generation element, and said surface electrodes are arranged in opposition to each other with said heat generation element being sandwiched therebetween; and an electronic control unit configured to estimate that a degree of deterioration of said surface electrodes is higher when a frequency becomes large in which a condition was satisfied in which a difference in temperature between two points located at a predetermined distance from each other on surfaces or in insides of said surface electrodes exceeds a predetermined temperature difference, than when the frequency is small.

5. The electrode deterioration degree estimation device for an electrically heated catalyst as set forth in claim 4, wherein the condition in which the difference in temperature between said two points on the surfaces or in the insides of said surface electrodes exceeds said predetermined temperature difference is such that the internal combustion engine is cold started and an integrated value of an amount of intake air in the internal combustion engine or an integrated value of the amount of heat supplied to the electrically heated catalyst, in a period of time from engine starting until a predetermined period of time has passed, exceeds a predetermined value.

6. The electrode deterioration degree estimation device for an electrically heated catalyst as set forth in claim 4, wherein a catalyst is supported by said heat generation element; and said electronic control unit estimates that the degree of deterioration of said surface electrodes is higher when a maximum oxygen storage amount of said catalyst becomes small, than when the amount is large.

* * * * *